Patented Aug. 31, 1954

2,687,991

UNITED STATES PATENT OFFICE 2,687,991

HEATING OIL

James R. Miller, Baytown, Tex., assignor, by mesne assignments, to Standard Oil Development Company, Elizabeth, N. J., a corporation of Delaware No Drawing. Application February 4, 1952, Serial No. 269,889

8 Claims. (Cl. 196—150)

The present invention is directed to a liquid composition for use as a fuel oil in home heating installations. More particularly, the invention is directed to a heating oil composition having a low carbon residue value. In its more specific aspects, the invention is directed to a heating oil composition comprising a sour distillate and having a low carbon residue value.

The present invention may be briefly described as involving a heating oil composition having a low carbon residue value which comprises a chemically unrefined or a sour distillate of crude petroleum and a cracked distillate. The distillates making up my composition boil in the range between 350° and 700° F.; the composition comprising the sour distillate of crude petroleum and cracked distillate has a carbon residue value no greater than 0.10 and is suitable for use in home heating installations even though it contains a substantial quantity of mercaptan sulfur.

By the term "chemically unrefined" or sour distillate of crude petroleum, I mean a virgin distillate of crude petroleum which is sour to the doctor test. In other words, the distillate contains a small quantity of mercaptan sulfur as reflected by the copper number test. It is intended that the term "chemically unrefined" will include those distillates which have been subjected to a preliminary treatment such as blowing with air to remove hydrogen sulfide or treatment with dilute caustic solutions to remove hydrogen sulfide. Such treatments leave the distillate in a sour condition and affect the copper number of the distillate only slightly. In short, air blowing or washing with a dilute caustic solution may reduce the copper number only to a slight degree of only one or two points. The sour distillate of crude petroleum may be obtained by fractional distillation of crude petroleum. For example, sour distillates obtained from West Texas or from the Hawkins or Salt Flat fields in Texas may comprise a component of my composition.

The cracked distillates forming the other component of my composition may be a thermally cracked or catalytically cracked distillate. For example, the other component of the composition may be a thermally cracked distillate or it may be a catalytically cracked distillate or it may be a mixture of thermally and catalytically cracked distillates. For example, if catalytically cracked distillates or heating oil distillates, as they are sometimes termed, are included in my composition, it is desirable that catalytically cracked distillates make up no more than 50% by volume of the composition since when the composition contains in excess of 50% by volume of the catalytically cracked distillate the specification of 0.1 carbon residue value may be exceeded. The catalytically cracked distillate may be produced from the catalytic cracking processes, such as a Thermophor catalytic cracking process, the so-called fluid catalytic cracking process or it may be obtained from a fixed bed operation where a bed of cracking catalyst is arranged and the feed is passed in a heated and/or vaporized condition through the bed.

The thermally cracked distillate making up the component of my composition may be used in amounts varying from 10% to 90% by volume. Thermal cracking processes have been known in the industry for a long number of years and further reference to thermally cracked distillates is believed unnecessary since the process by way of which the thermally cracked distillate or heating oil fraction is produced is a well known art.

The sour distillate of the crude petroleum, the catalytic cracking distillate or heating oil and the thermally cracked distillate or heating oil should boil in the range from 350° to 700° F. Fractions in this boiling range include the heating oil or gas oil fraction as they are sometimes termed.

The cracked distillates forming a component of my composition may be employed in a sweet or unsweetened condition. The catalytically cracked heating oil may be subjected to the so-called air sweetening process in which air causes an oxidation reaction to change the form of the sulfur compounds contributing to the sourness of the cracked distillates. The cracked distillates may suitably be sweetened by contact with an alkaline solution in the presence of air or suitably may be sweetened by the doctor sweetening process and the like. Similarly the thermally cracked heating oil may also be subjected to a sweetening operation in the presence of an alkali solution and air. The catalytically cracked heating oil may simply be caustic washed in the absence of air to remove aromatic mercaptans. Alternatively, both of the cracked components of my composition may be sweetened in admixture with each other, but not with the virgin distillate, by the above referred to air-caustic sweetening process. It must be emphasized, however, that the virgin distillate of a crude petroleum must be used in my composition in an unsweetened condition or in a chemically unrefined condition within the meaning of the terminology employed supra.

The invention will be further illustrated by the data presented in Table I which presents the compositions and the inspections of several specific compositions in accordance with my invention as compared with the prior art compositions.

TABLE I

|  | I | II | III | IV | V | VI | VII |
|---|---|---|---|---|---|---|---|
| Sweet Virgin Gas Oil, Percent by Vol. |  |  |  |  | 15 | 10 | 20 |
| Sour Virgin Gas Oil, Percent by Vol. | 15 | 20 | 10 | 10 |  |  |  |
| Thermally Cracked Heating Oil, Percent by Vol. | 25 | 40 | 40 | 40 | 25 | 40 | 40 |
| Catalytically Cracked Heating Oil, Percent by Vol. | 60 | 40 | 50 | 50 | 60 | 50 | 50 |
| Treatment of Cracked Heating Oils | (¹) | (¹) | (²) | (²) | (¹) | (¹) | (¹) |
| ASTM D-189-46 Carbon Residue | 0.12 | 0.10 | 0.06 | 0.08 | 0.53 | 0.15 | 0.15 |
| Robinson Color | 17¼ | 17¼ | 17½ | 17½ |  | 11 |  |
| Copper Number | 9 | 12 | 20 | 15 | 0-1 | 2-3 | 4-5 |

¹ Sweetened.
² Caustic washed.

In Table I the columns headed by Roman numerals II to IV illustrate the compositions which I claim as my invention. Referring now to Table I and columns II to IV, it will be seen that in all instances the three compositions had a carbon residue no greater than 0.10 although the copper number of the blends range from 12 to 20. Comparing these data with the composition of column I, it will be seen that when the concentration of catalytically cracked heating oil was in excess of 50% the carbon residue exceeded 0.10 and yet the copper number of 9 was less than that of the other compositions to which reference has been made. Referring again to Table I, it will be seen that the compositions designated by Roman numerals V to VI, which contain amounts of sweet virgin gas oil, in every instance fail to make the specification of 0.10 carbon residue although the amount of the sweet virgin gas oil was comparable to that of the blends shown in columns III and IV. Comparing column V with column I, it will be seen that although the composition of column I just failed to make the specification, that of column V, by the addition of sweetened virgin gas oil, had a carbon residue value of 0.53, way in excess of the specification; the other two blends of columns VI and VII were respectively 50% and 150% greater than that of columns II and III, respectively.

It will be noted also that the copper numbers of blends V to VII were in the range of 0 to 5 while that of blends II to IV were greatly in excess of this range being in the range of 12 to 20, showing that the presence of mercaptan sulfur in the virgin gas oil exerts a beneficial effect on the carbon residue test.

To illustrate further the effect of the sweetening of the virgin gas oil several additional compositions were made up of virgin gas oil and catalytically cracked heating oil in equal proportions. In these data presented in Table II, two of the blends contained sour virgin gas oil and in the other two blends the virgin gas oil was sweetened.

Table II

|  | VIII | IX | X | XI |
|---|---|---|---|---|
| Virgin Gas Oil, Percent by volume | 50 | 50 | 50 | 50 |
| Catalytic Heating Oil, Percent by volume | 50 | 50 | 50 | 50 |
| Carbon Residue | 0.08 | 0.07 | 0.13 | 0.14 |
| Treatment of Virgin Gas Oil | None | None | (¹) | (¹) |

¹ Sweetened.

It will be seen from the data in Table II that blends VIII and IX in accordance with the present invention had carbon residue values of 0.08 and 0.07, respectively, while blends X and XI had carbon residue values of 0.13 and 0.14, respectively, even though the latter two blends contained sweetened virgin gas oil which the skilled workman would ordinarily think would reduce the tendency of the heating oil to develop carbon residue by virtue of reducing the mercaptan sulfur content. Actually, in accordance with my invention, it is surprising that deliberately blending a sour virgin gas oil with a sweetened or unsweetened catalytic heating oil results in a product of unexpectedly improved properties.

Although it is not understood completely just why a composition in accordance with my invention which includes sour virgin gas oils is unexpectedly better than others containing a sweetened virgin gas oil with cracked distillates it is believed that the sweetened virgin gas oils contain disulfides from the sweetening operation which have a tendency to react with diolefins in the cracked distillates to form compounds which are detected in the carbon residue test. It is understood that this postulate is given by way of explanation and not by way of limitation. Thus it is seen that I have discovered that unsweetened or chemically unrefined virgin gas oils are compatible with cracked gas oils to give a blend of unexpected qualities in that my composition has carbon residue values surprisingly less than that of the prior art where the virgin gas oil was sweetened to convert mercaptans to disulfides. Thus in accordance with my invention I deliberately leave in the virgin gas oil the mercaptan content thereof such that they will not be in a form to react with diolefins.

In the several examples the sourness of the several compositions has been illustrated by the copper number test. This is a well-known analytical procedure in the petroleum industry. A discussion of the method of test may be found in "U. O. P. Laboratory Test Methods for Petroleum and its Products," 3rd edition, page H–61, Universal Oil Products Co., Chicago, 1947. This test is a measure of the mercaptan sulfur content of the oil being tested.

In the foregoing examples the improvement obtained by the practice of the present invention has been illustrated by the carbon residue test. This is a standard method of test for "Carbon Residue of Petroleum Products" commonly called the Conradson carbon residue and is identified as ASTM designation: D189–46. Under "Special Procedures" for this test 4(b) the special procedure for light distillate oils having carbon residue less than 0.05%, such as No. 1 and No. 2 fuel oils is given. Briefly, the sample is distilled according to the Standard Method of Test for Distillation of Gas Oils and Similar Distillate Fuel Oils (ASTM Designation: D158), to recover a 10% residuum. The carbon residue test is then run on this bottoms fraction by vaporizing a 10 gram sample at a high temperature in a protected porcelain crucible, at the conditions prescribed in the test, and weighing the remaining carbon residue.

The nature and objects of the present invention having been completely described and illustrated, what I wish to claim as new and useful and to secure by Letters Patent is:

1. A heating oil composition having a low carbon residue value which consists of a sour distillate of a crude petroleum and no more than an equal amount of a catalytically cracked petroleum distillate, said distillates boiling in the range between 350° and 700° F., and said composition having an ASTM D189-46 carbon residue value no greater than 0.10.

2. A heating oil composition having a low carbon residue value which consists of an amount in the range between 10% and 50% by volume of a sour distillate of a crude petroleum, an amount in the range between 50% and 90% by volume of thermally and catalytically cracked distillates, said distillates boiling in the range between 350° and 700° F., no more than 50% of the composition being a catalytically cracked distillate and said composition having an ASTM D189-46 carbon residue value no greater than 0.10.

3. A heating oil composition having a low carbon residue value which consists of equal amounts of a sour distillate of a crude petroleum and a catalytically cracked distillate, said distillates boiling in the range between 350° and 700° F., and said composition having an ASTM D189-46 carbon residue value no greater than 0.10.

4. A heating oil composition having a low carbon residue value which consists of 20% by volume of a sour distillate of a crude petroleum, 40% by volume of a thermally cracked distillate, and 40% by volume of a catalytically cracked distillate, said distillates boiling in the range between 350° and 700° F., and said composition having an ASTM D189-46 carbon residue value no greater than 0.10.

5. A heating oil composition having a low carbon residue value which consists of 10% by volume of a sour distillate of a crude petroleum, 40% by volume of a thermally cracked distillate and 50% by volume of a catalytically cracked distillate, said distillates boiling in the range between 350° and 700° F., and said composition having an ASTM D189-46 carbon residue value no greater than 0.10.

6. A composition in accordance with claim 5 in which the cracked distillates are sweet.

7. A composition in accordance with claim 5 in which the catalytically cracked distillate is sweet.

8. A heating oil composition having a low carbon residue value which consists of at least 10% and no more than 50% by volume of a chemically unrefined distillate of crude petroleum and thermally and catalytically cracked distillates in an amount in the range between 50% and 90% by volume, said distillates boiling in the range between 350° and 700° F., no more than 50% of the composition being a catalytically cracked distillate and said composition having an ASTM D189-46 carbon residue value no greater than 0.10.

References Cited in the file of this patent

UNITED STATES PATENTS

| Number | Name | Date |
| --- | --- | --- |
| 2,252,082 | Lloyd et al. | Aug. 12, 1941 |
| 2,380,294 | Cato et al. | July 10, 1945 |
| 2,417,236 | Cato et al. | Mar. 11, 1947 |
| 2,631,122 | Strickland et al. | Mar. 10, 1953 |